United States Patent

Foster

[11] 3,979,658
[45] Sept. 7, 1976

[54] AUTOMATIC ELECTRIC BATTERY CHARGING APPARATUS

[75] Inventor: George William Foster, Bolton, England

[73] Assignee: Chloride Group Limited, London, England

[22] Filed: Feb. 25, 1975

[21] Appl. No.: 552,759

[30] Foreign Application Priority Data

Feb. 26, 1974 United Kingdom............... 8591/74

[52] U.S. Cl.................................. 320/23; 320/37; 320/39
[51] Int. Cl.² ........................................ H02J 7/04
[58] Field of Search.................... 320/39, 40, 21–24, 320/37, 38

[56] References Cited
UNITED STATES PATENTS

| | | | |
|---|---|---|---|
| 2,420,577 | 5/1947 | Van Lew | 320/40 |
| 3,794,905 | 2/1974 | Long | 320/39 X |
| 3,886,427 | 5/1975 | Long | 320/39 X |

Primary Examiner—J D Miller
Assistant Examiner—Robert J. Hickey
Attorney, Agent, or Firm—Watson, Cole, Grindle & Watson

[57] ABSTRACT

An automatic battery charger of taper type has means for comparing a reference signal with a control signal varying with battery voltage, and terminating the charge when the rate of rise of battery voltage falls below a predetermined value. To prevent spurious operation due to mains voltage variation, the control signal comprises the difference between a signal dependent on battery voltage and a signal dependent on a.c. supply voltage.

The rate of rise of the control signal is monitored by comparing it with a staircase reference voltage which is increased by a step whenever the control signal exceeds it, and termination is initiated if the time interval between two steps exceeds a given period. This may be long enough, e.g. half an hour, to provide an equalizing charge without requiring additional equipment.

18 Claims, 7 Drawing Figures

AUTOMATIC ELECTRIC BATTERY CHARGING APPARATUS

This invention relates to automatic battery charging apparatus, including terminating means for initiating the termination of a phase of the charge.

Many proposals have in the past been put forward for automatically terminating the charge of a battery when the battery is fully charged. For example one common method has been to charge the battery until the voltage reaches a given value, and then switch over to a timed run-out charge for a constant time before switching off the charging current. Unfortunately the rise of battery voltage to a given value depends on many factors other than the state of charge such as the condition and age of the battery, the temperature and the charging current, so that this method cannot be relied upon to ensure that a battery will be fully charged but not overcharged when conditions vary.

The present applicants have also proposed a system in which the charging current is adjusted to bring the battery voltage to a reference value and the reference value is progressively increased, the charge being terminated when the current required to keep the battery voltage at the reference value, having sharply decreased, begins to increase again. Such an arrangement tends to be relatively costly since it involves controlling the main charging current, which, in the case of a big battery, may amount to hundreds of amperes at hundreds of volts.

A further arrangement proposed by the applicants involves switching off the charging current periodically, and monitoring the battery voltage during the open circuit intervals, when it would of course be independent of charging current since the latter is switched off. Whilst such an arrangement is in many ways satisfactory the switching off of the charging current reduces its average value, and in addition involves frequent operation of a heavy contactor tending to reduce its life and possibly cause objectionable noise.

The present applicants' British Pat. specification No. 1097451 describes a charger in which the initiation of termination of the charge is dependent upon the rate of rise of battery voltage, and in particular occurs when the rate of rise falls off as the battery approaches the fully charged condition. This known arrangement depends on monitoring the rise of voltage that occurs in a given time.

As indicated above certain known forms of automatic charger involve means such as thyristors for controlling the magnitude of the main charging current during the charge, and are relatively expensive. The present invention is particularly applicable to chargers having a relatively simple main charging circuit giving what is known as a taper charge. In a simple charger the main charging circuit may comprise no more than a transformer and a bridge-rectifier. In such an arrangement the charging voltage would be nearly constant but the charging current would vary excessively with factors such as variations of supply voltage and the condition, temperature, and state of charge of the battery. It is however only necessary to insert an impedance such as a resistor or an inductor in the circuit to cause the output voltage of the charger to fall as the charging current increases, thus making the charging current less dependent on the variable factors such as those referred to above. In addition it is well known that during the later stages of charge when gassing occurs the charging current must be restricted to a value substantially less than that which would be acceptable during the early stages. This is ensured in the taper charger, in which the initial current when the battery voltage is low may be two or three times that to which the charging current during the final stages of charge is restricted merely by the rise of voltage of the battery.

In such a simple taper charger it is of course inevitable that both the charging current and the battery voltage will vary with fluctuation of supply voltage so that the latter will also cause changes in the rate of change of battery voltage.

To overcome this difficulty in accordance with one aspect of the present invention automatic electric battery charging apparatus includes means for supplying a direct charging current to battery terminals from a.c. supply terminals, such means including impedance to give a taper charge characteristic, whereby the charging current falls substantially with rise of voltage, and terminating means responsive to the rate of rise of a control signal for initiating the termination of a phase of the charge when the rate of rise of the control signal falls below a predetermined value, in which the control signal comprises the difference between a signal dependent on battery voltage and a signal dependent on a.c. supply voltage.

Preferably the components of the control signal are so proportioned that the control signal is substantially independent of fluctuations of a.c. supply voltage, at least when the battery is approaching the fully charged condition.

According to a further aspect of the invention such apparatus includes means including a voltage comparator arranged to compare a reference voltage with a control signal varying with battery voltage, means for repeatedly increasing the reference voltage by a step relatively to the control signal whenever the control signal exceeds the reference voltage, and means for initiating the termination when the time interval between steps exceeds a predetermined value.

The reference voltage may be effectively increased step-by-step relatively to the control signal by keeping the reference voltage constant and decreasing the control signal step-by-step relatively to the battery voltage. It may, however, be more convenient to keep the control signal constant relatively to the battery voltage and increase the reference voltage step-by-step. The steps of voltage may be substantially equal. Thus whereas the prior specification referred to above depends on monitoring the rise of voltage that occurs in a given time, the arrangement in accordance with the preferred form of the present invention monitors the time taken for the battery voltage to rise by a given amount. This improves the reliability and simplicity of the apparatus since the sensitivity required of the voltage comparator remains the same throughout the charge. In addition the time taken for the voltage to rise by a given step increases progressively during the charge and the final period, during which the battery voltage fails to rise sufficiently to cause the control signal to exceed the reference voltage, will provide an appropriate period of equalising or run-out charge without the necessity for any special timing means to provide for such an equalising charge.

Reference has been made above to terminating a phase of the charge. Thus in many systems a complete charge comprises two or more phases, for example a main phase in which the main charge occurs (and which may bring the battery to the fully charged condition), followed by a further phase, possibly at a lower charging current which may be continued for a predetermined time or indeed may continue indefinitely at a sufficiently low current. In applying the present invention it is however preferred that the terminating means should serve to terminate the charge completely, the predetermined time interval being sufficient to provide an equalising charge. Thus the predetermined time interval may be not less than half an hour. Conveniently, in the case of a lead acid battery, the reference voltage may be increased by steps equivalent to not more than 20 millivolts per cell.

In a convenient form of the invention the means for providing a reference voltage include a binary weighted resistance network controlled by a binary reference counter to increase the effective resistance of the network step-by-step. The binary reference counter may be stepped by a clock oscillator controlled by a comparator, to increase the reference voltage by a step only when the control signal exceeds the reference voltage.

The apparatus may include an interval timer counter arranged to be reset whenever the reference voltage is increased by a step, and fed by an oscillator (which may be the clock oscillator providing the reference voltage) to count time periods so long as the reference voltage exceeds the control signal, and arranged, if it reaches a predetermined count, to initiate termination.

It is well known that during the early stages of charge of a discharged battery the voltage may rise relatively rapidly and then more slowly and it is therefore necessary to prevent the charge terminating means of any system relying on rate of rise of the battery voltage from switching off the charge prematurely. Accordingly it is preferred that the terminating means be inoperative until the battery voltage exceeds a predetermined value, for example in the case of a lead acid battery, 2.35 volts per cell.

The proportion of the component of the signal dependent on the a.c. supply voltage to the component dependent on battery voltage may vary in accordance with the characteristics of the taper charger. For example where the initial current taken by a discharged battery at 2.1 volts per cell is 2 to 3 times the final current taken by a charged battery at 2.6 volts per cell, the component of the signal dependent on a.c. supply voltage may represent 0.8 volts per cell at the nominal voltage. This figure is arrived at by tests on batteries and calculation.

Thus in a particular case it was found that the voltage on charge of a fully charged battery connected to a charger having a 54% taper (i.e. ratio of final to initial charging current) was 2.42 volts per cell at a supply voltage of 190 volts, 2.58 volts per cell at 230 volts, and 2.68 volts per cell at 270 volts. It can readily be calculated that by subtracting from the battery volts per cell a compensating signal proportional to mains voltage and having a value of 0.75 volts per cell at 230 volts, the resultant difference will be substantially independent of mains voltage.

For another charger having a taper of 39% the corresponding figures were 2.44 volts per cell at 190 volts, 2.63 volts per cell at 230 volts and 2.76 volts per cell at 270 volts. In this case the calculation indicated a compensating signal of 0.92 volts per cell at the nominal mains voltage of 230.

A round figure compromise of 0.8 volts per cell, or roughly ⅓ of the battery voltage in the range from 2.4 to 2.6 volts per cell gives an acceptably low variation of the signal with mains voltage.

The invention may be put into practice in various ways but one specific embodiment will be described by way of example with reference to the accompanying drawings in which.

Figure 1:
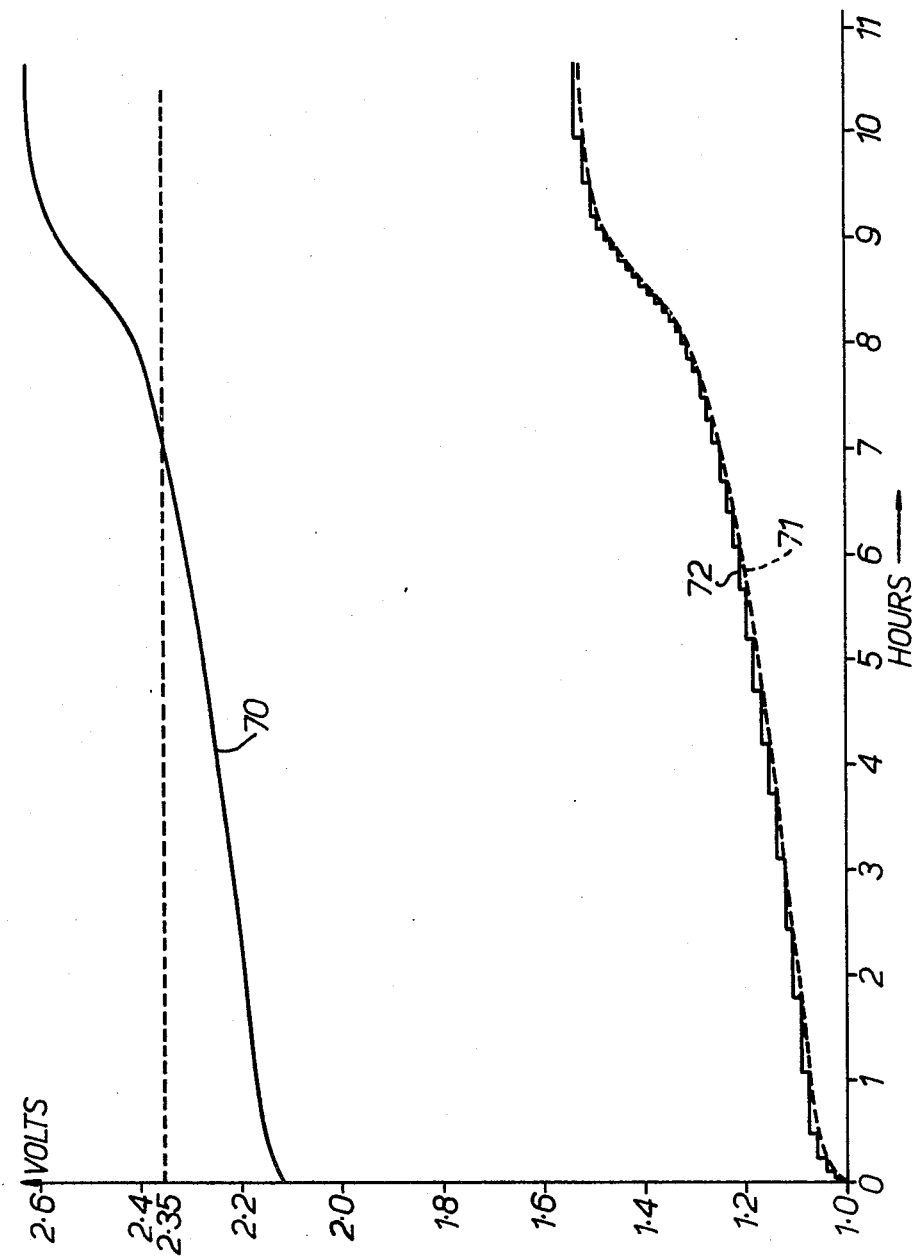
FIG. 1 is a graph illustrating typical behaviour of battery voltage and reference voltage during a charge in accordance with the present invention.

The general principle of the charger will first be briefly explained with reference to the curves of FIG. 1 which represent (not to scale) typical variations of battery voltage 70 during a charge from a taper charger. The voltage of a lead-acid battery rises comparatively slowly during the main portion of the charge till it reaches about 2.35 volts per cell, after which its rate of rise increases substantially and gassing occurs, and finally the rate of rise falls off as it approaches its fully charged condition when obviously no further increase will occur.

As already explained, the precise value of voltage depends on many factors and the present arrangement relies on the fall-off of voltage rise rate as the fully charged condition is reached.

For this purpose a control voltage 71, representing the battery voltage compensated to allow for changes of a.c. supply voltage, is compared with a "staircase" voltage 72 which is increased step-by-step. Each step increases the staircase voltage by a constant amount, but only occurs when the control voltage exceeds the existing value of the staircase voltage.

Thus the time interval between successive steps is inversely proportional to the rate of rise of the control voltage, and hence of the battery voltage if the supply voltage remains constant. The charger is arranged to switch off the charging current when the duration of a step exceeds a given value indicating that the rate of rise of voltage has fallen below a given value and the battery is fully charged.

The length of this final step may be chosen to provide a run-out or equalising charge without requiring a separate timer for the purpose. For example if the duration is chosen as 30 minutes and the voltage step as 11.3 mv per cell, the charge will be switched off when the battery voltage first fails to increase by 11.3 mv per cell in 30 minutes.

During the early part of the charge the rate of rise of battery voltage will also be low and to prevent the charge being switched off at that time the control is rendered inoperative until the battery voltage exceeds 2.35 volts per cell (in the case of a lead-acid battery).

Figure 2:
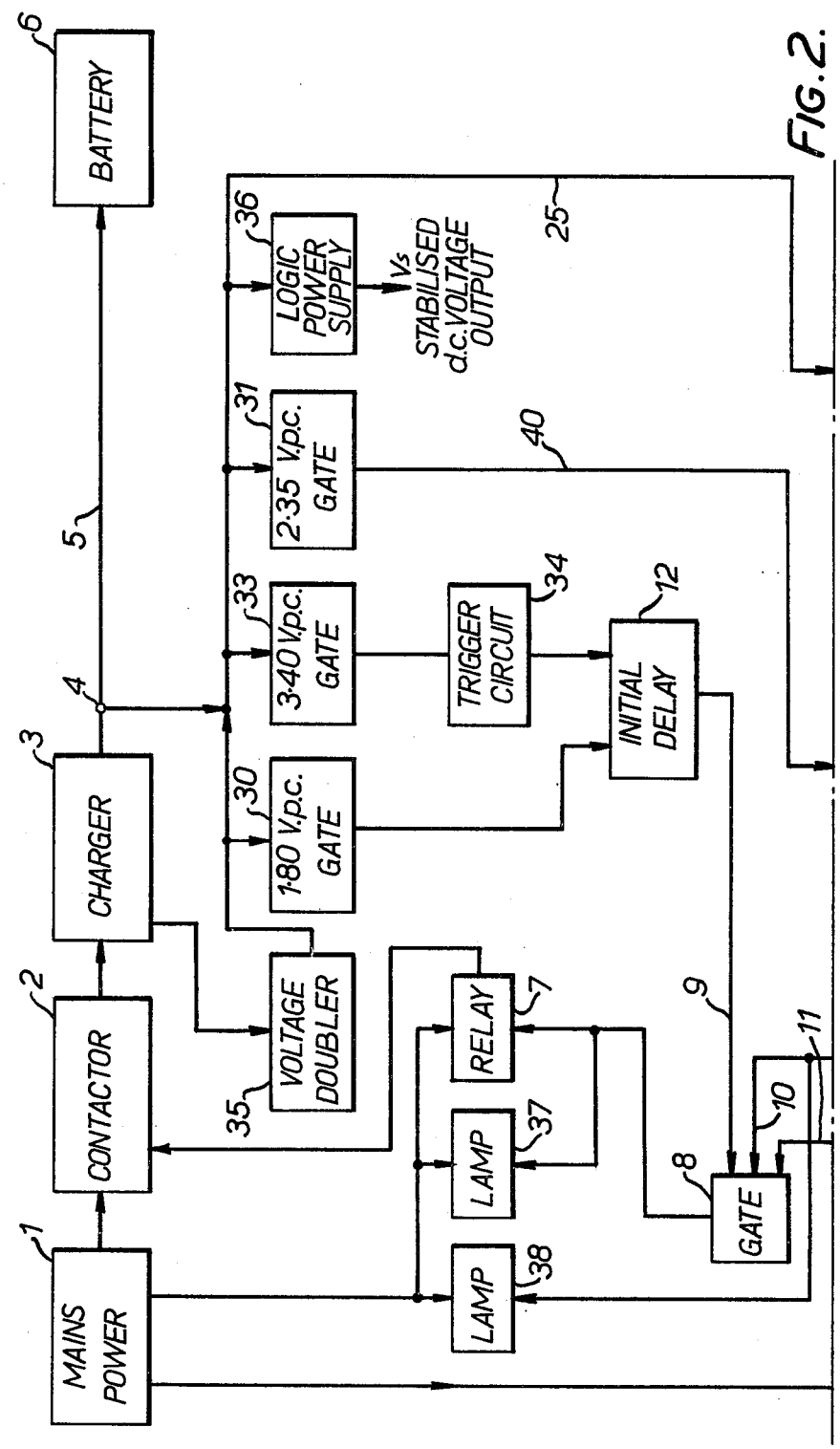
FIGS. 2 and 3 are two portions of a block diagram of a charger.
Figure 3:
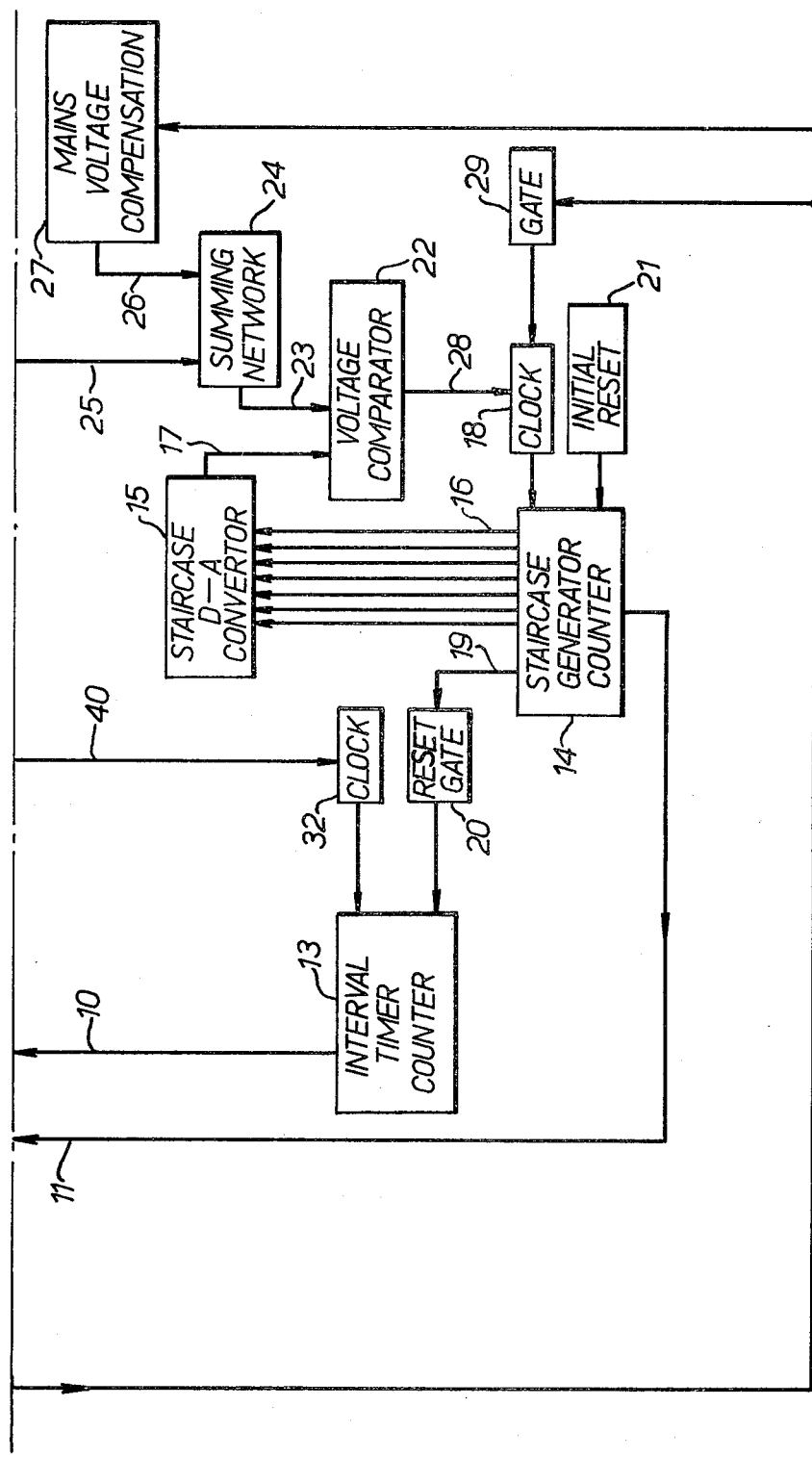

The main features of the circuit will now be described briefly with reference to the block diagram of FIGS. 2 and 3, before describing further details of the individual parts with reference to FIGS. 4 to 7.

The charging circuit comprises a.c. mains supply terminals 1 supplying a.c. power through a contactor 2, to a transformer and rectifier 3, delivering direct current to charger terminals 4, and then through the charger connecting cable 5, to the battery 6. The control circuits receive power and voltage signals from the battery 6 via the charger terminals 4. Power is also obtained from the mains for providing a mains voltage conpensating unit 27 and for energising two indicating lamps 37, 38 and a relay 7. The latter provides a pair of isolated contacts for switching a.c. power to the coil of the contactor 2. A further input signal is obtained from the secondary winding of the charger transformer and is fed to a voltage doubler 35 to provide an increased d.c. voltage at the charger terminals 4 to switch off the charger when the battery 6 is disconnected.

When a battery is connected to the charger terminals the controller logic circuits receive power from it at substantially constant voltage Vs via a stabilizing unit 36, and begin to perform their respective functions. A gate 30 determines whether or not the battery voltage is above the equivalent of 1.80 volts per cell for the number of cells for which the charger is designed. If it is below 1.80 volts per cell the charger does not switch on. If it is above 1.80 volts per cell an initial delay is allowed to expire and the charger switches on at the end of this delay provided by initial delay 12. The switch-on occurs when the initial delay signal 9 disappears from the input of a gate 8 whose output then rises to switch on the relay 7 and the lamp 37.

During the course of the charge a mains compensating signal 26 from the mains voltage compensation 27 is subtracted from a battery signal 25 in a summing network 24 to provide a control signal 23. This is compared by a voltage comparator 22 with a staircase output signal 17 of a Digital to Analogue (D-A) converter 15 fed with digital signals from a first binary counter 14 (which may be termined a staircase generator counter) receiving clock signals from a clock 18. The output of the voltage comparator is arranged to switch on the clock 18 whenever the control signal 23 exceeds the staircase signal 17. Thus a closed loop is formed which is in the quiescent state only when the control signal 23 is below the staircase signal 17. Whenever, as the battery voltage rises, a point is reached at which the control signal exceeds the staircase signal the latter is increased by a step. The interval time between the counts of the staircase generator 14, corresponding to a build-up in the staircase 17, gives a measure inversely proportional to the rate of rise of the control signal 23 and hence the rate of rise of battery voltage 25.

The staircase generator counter 14 is reset to zero count by an initial reset 21 which delivers a reset pulse at the moment the logic power supply is established. A gate 29 prevents operation of the clock 18 and thus the rising of the D-A converter output signal 17 if mains power is not present. This stops the closed loop responding to the high value of the control signal which would otherwise exist in the absence of the mains compensating signal.

The interval times between steps of the staircase generator counter 14 are measurerd by a second binary counter 13 which may be termed the interval timer counter. This counter only operates when the voltage at the charger terminals is above the equivalent of 2.35 volts per cell. This condition is sensed by a gate 31 which then switches on a clock 32 to deliver clock pulses continuously to the interval timer counter. A reset gate 20 fed by a signal 19 from the staircase generator counter 14 delivers a reset pulse to reset the interval timer counter 13 back to zero at the beginning of each step of the staircase voltage 17. When the counter 13 reaches a specified count a signal 10 is delivered to the gate 8 to switch off the relay 7 and the lamp 37 and thus stop the charge. At the same time the signal 10 switches on the lamp 38. The time for the counter 13 to reach the specified count is referred to as the run-out time.

The staircase generator counter 14 also generates a signal 11 if ever the count representing the maximum value of the staircase signal 17 is exceeded. This signal acts on the gate 8 to stop the charge.

If at any time during the charge the battery is disconnected, the peak voltage at the charger terminals rises above 3.4 V.p.c. due to the voltage waveform impressed from the voltage doubler 35. A gate 33 responds to this condition and trips a trigger circuit 34 to re-activate the initial delay 12. The initial delay signal 9 re-appears to cause the gate 8 to open the relay 7 and thus open the contactor 2 to switch off the charger.

The various portions of the circuit will now be described in greater detail with reference to FIGS. 4 to 7.

Figure 4:
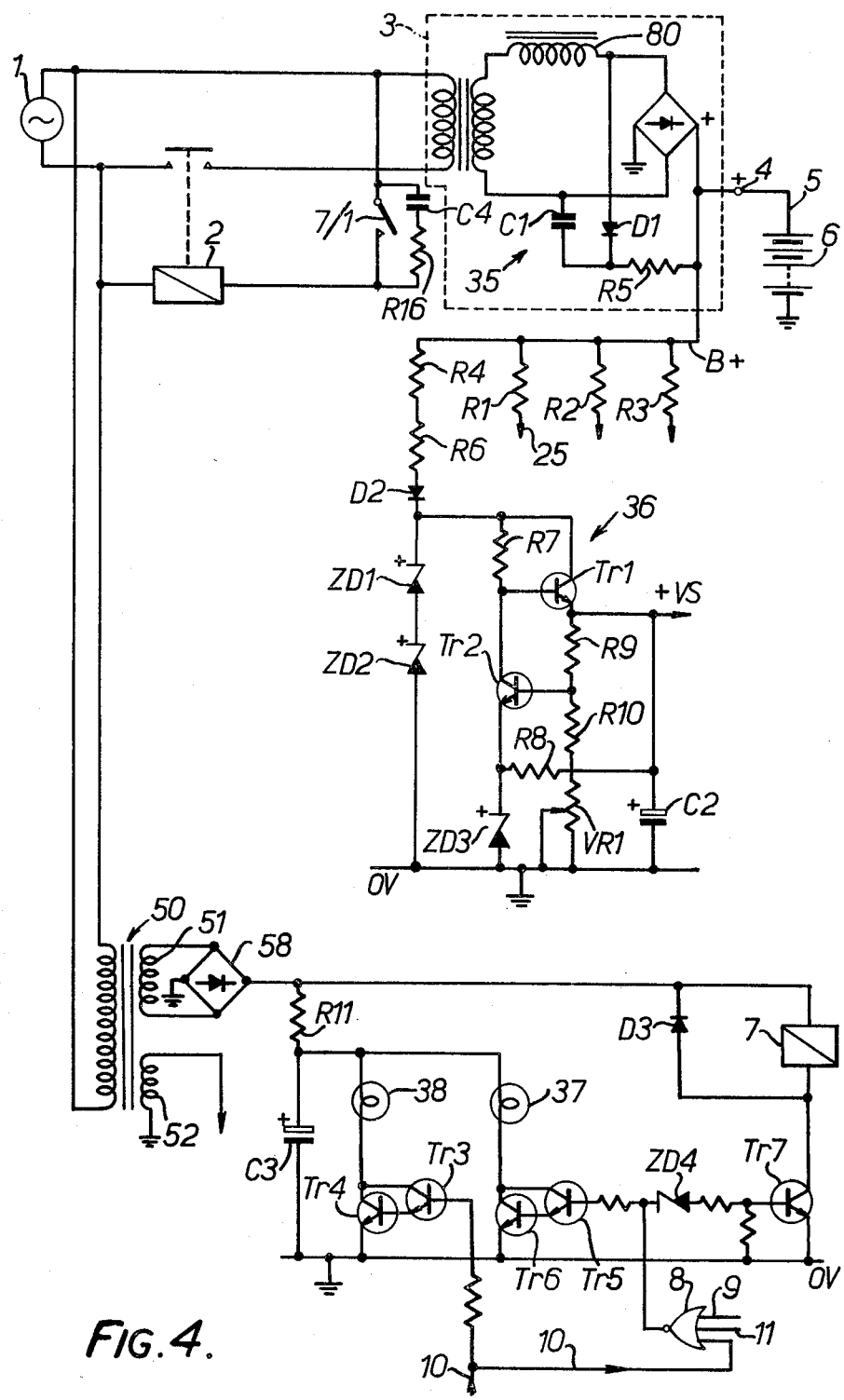
FIG. 4 illustrates an exemplary embodiment of the power supply and charging circuit of FIG. 2.

FIG. 4 shows the power supply and the charging circuit (omitting some conventional components such as indicating lamps, switches, fuses etc.). Briefly the main transformer 3 is supplied through a contactor 2 and supplies a full wave rectifier through a choke 80, giving a taper characteristic i.e. a charging current falling as the battery voltage rises.

Figure 5:
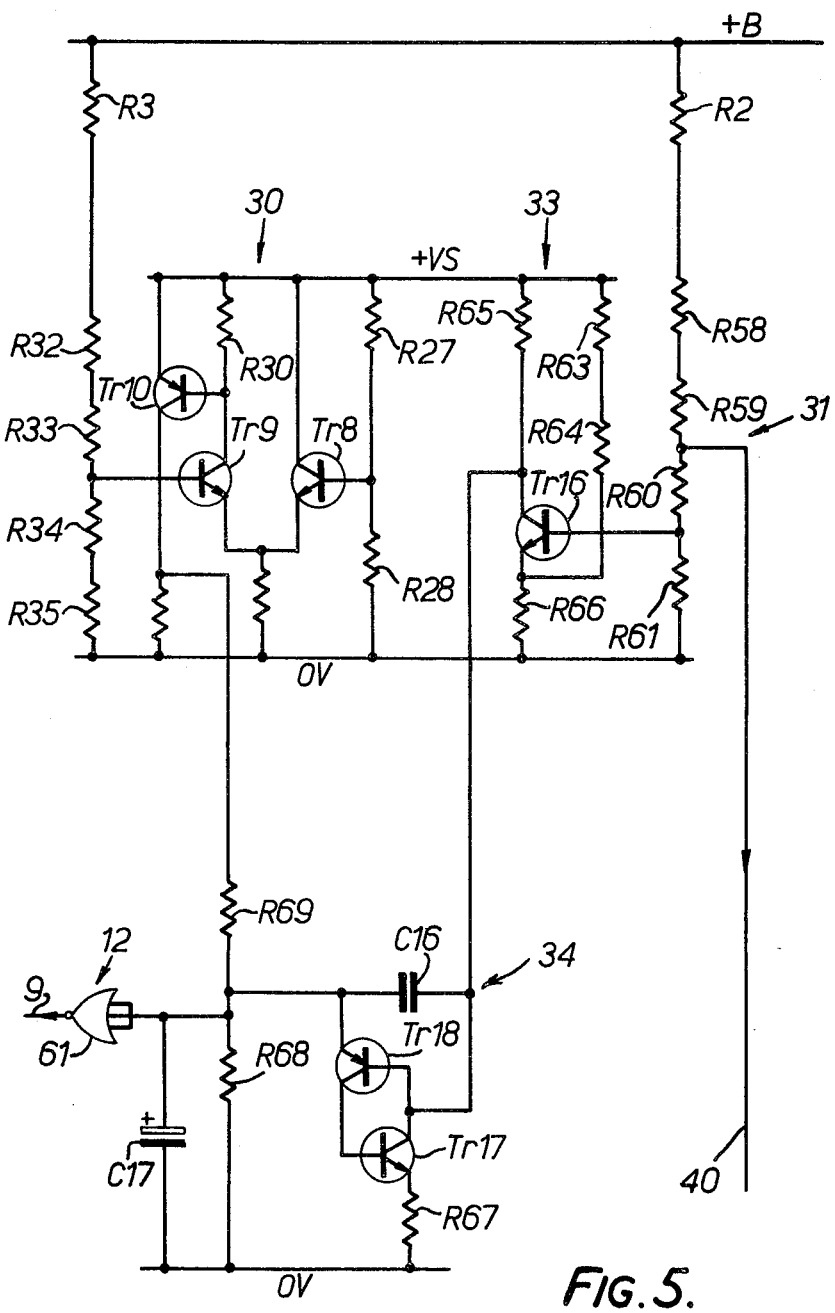
FIG. 5 shows an exemplary embodiment of voltage gates and initial delay circuits of FIG. 2.
Figure 6:
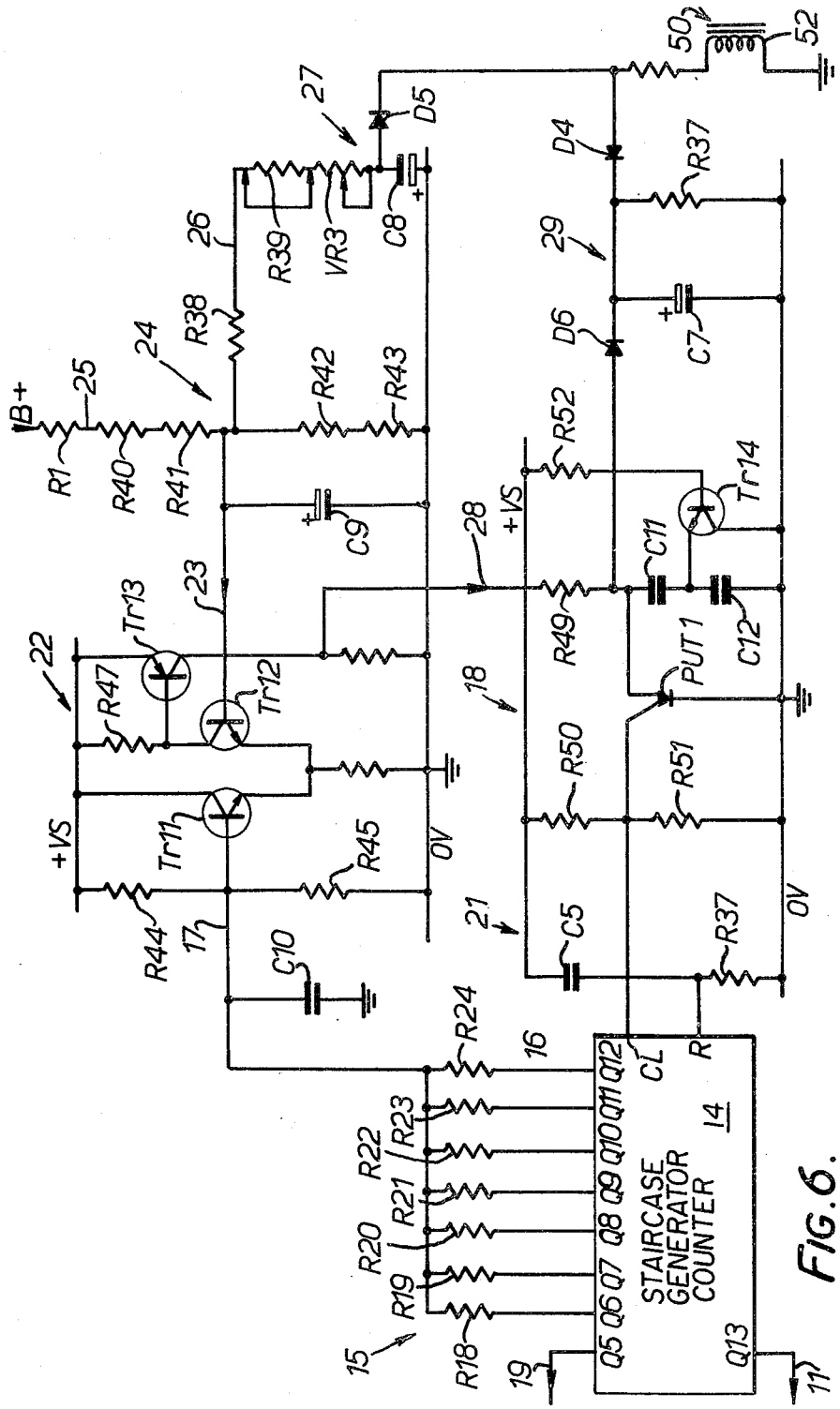
FIG. 6 illustrates an exemplary embodiment of staircase voltage generator, the driving clock associated therewith, as well as exemplary embodiments of the and voltage comparator compensating network of FIG. 3.

A number of circuits receive supplies from the positive battery terminal B+ through resistors R1–R5 which are chosen or adjusted to suit the number of cells (and of which R1 to R3 also appear in FIGS. 5 and 6).

Also connected to the supply (not controlled by the contactor) is a second transformer 50 having two secondary windings 51 and 52, winding 51 supplying direct current for the lamps 37 and 38 and the relay 7 controlling the contactor 2, and the other winding 52, (also shown in FIG. 6) providing the signal compensating the battery voltage for mains voltage variation.

In the "ready" state prior to connecting a battery the charger isolating switch-circuit breaker (not shown) is closed but the contactor 2 is open. Thus the lamp and relay section is provided with power but the logic sections are dead (Reference FIGS. 1 and 2).

When a battery is connected to the charger, power is delivered to the logic power supply 36. This provides a stable 9V supply (+Vs) for operating the logic sections of the circuit. The power supply circuit is a conventional transistor series regular comprising the transistors Tr1 and Tr2, the resistors R7 to R10, the adjustable resistor VR1 and the zener diode ZD3 in the usual configuration. The output voltage is set by adjustment of VR1. Stabilisation against self oscillation is provided by a capacitor C2 at the output. The input voltage to the regulator is limited to 40V by zener diodes ZD1, ZD2 and input resistors R4, R6. A diode D2 limits the power dissipation in the input resistors should the battery be accidentally connected to the charger with the wrong polarity. In this case the regulator output voltage would be too low to operate the logic sections and the contactor 2 would remain open.

The separate power supply for energising the indicator lamps 37,38 and the contactor relay 7 comprises the transformer 50, a rectifying bridge 58 and a smoothing capacitor C3 with a current limiting resistor R11. The amber lamp 37 is switched on by a super alpha transistor pair Tr5, Tr6 and the green lamp is switched on by a similar pair Tr3, Tr4. The relay coil is energised by a single transistor switch Tr7. A surge suppression diode D3 is fitted across the relay coil 7. Spark suppression for the relay contacts 7/1 is provided by a capacitor C4 in series with a resistor R16 connected across the contacts. A zener diode ZD4 is included in the base circuit of the transistor Tr7 to provide a switching voltage threshold of about 5.6 V. This stops the relay contacts 7/1 and thus the contactor 2 from chattering when the battery is disconnected during charge and the logic supply voltage is decaying.

The amber lamp 37 and the relay 7 (controlling the container to terminate the charge) are operated by a signal from the output of a 3-input NOR gate 8. This gate receives three logic input signals 9, 10 and 11 from the control sections. The green lamp 38 is operated directly by the logic signal 10. Positive logic is used throughout the circuit such that the 0 state is represented by OV and the 1 state by approximately 9V.

As shown in FIG. 5 the signal 9 is associated with the initial delay 12, the 1.80 V.p.c. gate 30 and the 3.40 V.p.c. gate 33. The initial delay is obtained from a capacitor C17 which receives a charging current through a resistor R69 from the output of the 1.80 V.p.c. gate 30. The capacitor voltage is applied to the input of a logic gate inverter 61 which provides a switching voltage threshold. The output of the gate, i.e. the signal 9, starts in the 1 state and later switches to the 0 state when its input exceeds about 3V. Thus the output of the gate 8 is held in the 0 state for the time taken to charge the capacitor C17 to about 3V.

The 1.80 V.p.c. gate 30 provides the 9V output to charge the initial delay capacitor C17. This output is only available if the initial battery voltage is above 1.80 V.p.c. The gate comprises transistors Tr8 and Tr9 in a long-tailed pair voltage comparator configuration with the output across a resistor R30 amplified by a transistor Tr10. The voltage for charging the capacitor C17 is obtained from the collector of the transistor Tr10. The reference voltage for the comparator is provided by a potential divider comprising resistors R27 and R28 connected across the logic power supply lines. This applies a voltage of 5.4V (1.80 V.p.c. for three cell sample) to the base of the transistor Tr8. The battery voltage is sampled at the base of the transistor Tr9 from the potential divider comprising resistors R3 and R32 to R35, which are weighted to give a value of 20 kilohms per cell.

The 3.40 V.p.c. gate 33 provides an output signal to trip the trigger circuit 34 so as to rapidly discharge the initial delay capacitor C17 if the charger terminal voltage rises above the equivalent of 3.40 V.p.c. (This condition normally exists for a very short portion of the cycle if the battery is disconnected while the contactor 2 is closed, the voltage doubler 35 impressing voltage peaks of between 5 and 6 volts per cell across the charger terminals). The circuit comprises a single transistor Tr16 whose emitter is held at a fixed voltage obtained from a potential divider comprising resistors R63, R64 and R66 connected across the logic power supply lines. A 3-cell proportion of the charger terminal voltage is sampled from a tapping on a potential divider comprising resistors R2 and R58 to R61. This is applied to the base of the transistor Tr16 and compared with the fixed voltage at its emitter. In normal operation the base voltage is below the emitter voltage and the transistor is cut off.

The output voltage at the collector remains at 9V. At charger terminal voltages in excess of 3.40 V.p.c. the base voltage exceeds the emitter voltage and the transistor Tr16 switches on. The collector voltage falls to about 5V due to the current flowing in a collector resistor R65.

The trigger circuit 34 responds to the output voltage of the 3.40 V.p.c. gate 33 when it falls to about 6½. This current comprises two transistors Tr17 and Tr18 in a re-generative feedback pair configuration. The arrangement is essentially the two transistor equivalent of a thyristor with an anode gate instead of a cathode gate. The emitter of the upper transistor Tr18 is held at the maximum voltage to which the initial delay capacitor C17 charges up. This is set to about 7V by a resistor R68 connected in parallel with the capacitor C17. The output voltage of the 3.40 V.p.c. gate is applied to the base of the upper transistor Tr18. This is normally about 9V so that the transistor Tr18 is reverse biased and is therefore cut off. As soon as the base voltage falls to about 6½V the transistor Tr18 begins to turn on. This provides base current to the lower transistor Tr17 which also begins to turn on. The collector current of Tr17 is taken from the base of Tr18 so that a re-generative action occurs whereby both transistors switch very rapidly to the fully conducting state and discharge the capacitor C17 quickly. The maximum value of the capacitor discharge current is limited to about 70 mA by a resistor R67 connected in series with the emitter of the lower transistor Tr17. A capacitor C16 connected between the emitter and base of the upper transistor Tr18 prevents the trigger circuit from responding to spurious voltage spikes.

The voltage doubler 35 (see FIG. 4), which provides the voltage peaks to trip the circuit when the battery is disconnected during charge, comprises a capacitor C1 in series with a diode D1. The arrangement is connected across the a.c. input terminals of the charger rectifier so that it receives an a.c. signal voltage of an amplitude determined by the charger transformer secondary voltage. The output voltage of the arrangement is taken from the junction of the capacitor and diode and is applied to the positive charger terminal via a load resistor R5. The output voltage wave-form is a replica of the transformer secondary voltage with the lower peaks coinciding with the OV, or battery negative, line of the logic power supply. Thus almost the full peak-to-peak value of the transformer secondary voltage is presented to the controller signal inputs when the battery is disconnected. While the battery is connected the doubler voltage is completely absorbed in the load resistor R5 due to the current drain taken by the battery.

As described below with reference to FIGS. 6 and 7, the signals 10 and 11 applied to the gate 8 are derived from the main sections of the controller which deals with the measurement of the rate of rise of battery voltage. Both signals remain in the 0 state during the course of a charging phase. Signal 10 changes to the 1 state to stop the charge when the charger terminal voltage is above 2.35 V.p.c. and the step interval in the internally generated staircase voltage exceeds the specified value. Signal 11 changes to the 1 state to stop the charger if the staircase voltage range is exceeded.

As shown in FIG. 6 the staircase voltage 17 is generated by a Digital to Analogue (D-A) converter 15 comprising seven binary weighted resistors R18 to R24, arranged as a summing network connected to the outputs 16 of a binary counter 14.

The latter is described as the staircase generator counter 14. It is a C/MOS type of counter in which the outputs Q1 to Q13 (of which Q1 to Q4 are not shown) are connected in binary sequence alternatively to the 0V line and the +Vs line of the logic power supply. When connected to either line the internal conducting channel presents a residual resistance of between 800 and 1000 ohms. In the non-conducting state the channel resistance is of the order of $10^{12}$ ohms. The counter outputs are reset to the "all zeros" state by a high level signal (in this case 3 to 6V) applied to the reset (R) input. The counter is advanced one count by the negative-going transition of a square wave pulse applied to the clock (CL) input.

The summing resistors of the D-A converter 15 are connected to stages Q6 to Q12 of the binary counter 14 so that thirty two clock pulses are required for each step rise of the staircase voltage 17. This allows a faster, and consequently a lower cost, clock to be used. The resistors R18 to R24 of the D-A converter 15 are weighted in the binary sequence 20K, 40k, 80k, 160K, 320k, 640k and 1,280k. In the case of the lowest value a counter internal resistance of 800 ohms is allowed for so that the actual value of R24 is 19.2k instead of 20k. The switching spikes, which would normally occur at the output of the summing network, are filtered out by a capacitor C10. The initial value and step height of the staircase voltage output 17 are determined by the relative values of two scaling resistors R44 and R45. In this case the initial value is set to about 2.82V and the step height to about 34mV. These figures are compared against a three-cell sample of control voltage so that the values per cell are 0.94V and 11.3mV respectively.

The voltage comparator 22 compares the staircase voltage 17 with the control voltage 23. The comparator circuit comprises transistors Tr11 and Tr12 in a conventional longtailed pair comparator configuration with the output across a resistor R47 amplified by a transistor Tr13. The output voltage 28 is taken from the collector of Tr13 to operate the clock 18 which drives the counter 14. The clock 18 is operated when the comparator output voltage 28 rises to its high level of about 9V. This condition occurs each time the staircase voltage 17 is exceeded by the control voltage 23. At all other times the comparator output is low, about 0V, and the clock 18 is stopped.

The control voltage 23 represents the algebraic sum of a three cell battery voltage sample and a rectified and smoothed sample of the a.c. mains voltage. The two are added together in the summing network 24. The battery voltage is sampled across the potential divider comprising the resistors R1 and R40 to R43, which are weighted to give a value of 20 kilohms per cell. The mains voltage compensating sample is obtained from an auxiliary secondary winding 52 of the transformer 50 (also shown in FIG. 4). This is half-wave rectified by a diode D5 and smoothed by a capacitor C8. The polarity of rectification is chosen so that the mains compensating voltage is of opposite polarity to the battery voltage sample. The mains compensating voltage is connected to the three cell sample point on the battery potential divider via resistors R38, R39 and an adjustable resistor VR3. The current through the lower potential divider resistors R42, R43 due to the mains compensating voltage flows in the opposite direction to that due to the battery voltage. Thus the voltage drop across the resistors R42, R43, which provides the control voltage, is reduced by an amount determined by the value of the secondary voltage of the transformer 50 and the setting of the adjustable resistor VR3. The control voltage is initially set to 4.5 V for specified battery and mains voltage of 2.60 V.p.c. and 230V respectively. Smoothing of the control voltage is provided by a capacitor C9.

The clock 18 is a conventional programmable unijunction oscillator with a facility for speeding up the oscillations for test purposes. The gate of the programmable unijunction transistor PUT1 is provided with a fixed reference voltage of about 6½ volts from a potential divider comprising resistors R50 and R51. The timing circuit connected to the anode of PUT1 comprises two capacitors C11 and C12, connected in series, and a charging resistor R49 which is connected to the output 28 of the comparator 22. The smaller value capacitor C12 is shunted by a transistor Tr14 which is normally in the fully conducting state by virtue of the permanent base connection, via a resistor R52, to the +Vs line. Thus the oscillator frequency is normally determined by the higher value capacitor C11, the smaller value capacitor C12 being shorted out by the transistor Tr14.

During the initial testing the base of the latter can be shorted to the 0V line thereby cutting the transistor off. This places the two capacitors C11 and C12 in series and the timing capacitance is effectively reduced by a factor of about 33. Thus the oscillator frequency is speeded up by the same factor and the cycle of events of the controller takes place 33 times faster than normal. The clock pulse is taken from the gate of PUT1. The pulse waveform at this point is a negative going square wave starting from about 6½ and falling to almost 0V. The pulse shape is good enough to be applied directly to the clock input of the binary counter 14.

A gate 29 is included to stop the clock 18 operating if the mains supply is not switched on when the battery is connected, or the mains supply is interrupted during the course of a charge. This gate is necessary because in the absence of the mains compensating signal the control voltage 23 is beyond the range of the staircase voltage 17. The gate circuit consists of a resistor R37 which shunts the timing capacitors C11, C12 of the clock 18 through a diode D6. The latter is normally reverse biased by a voltage applied from the auxiliary secondary winding 52 of the transformer 50 through a diode D4 and smoothed by a capacitor C7. Removal of the mains voltage causes the diode D6 to become forward biased and the shunting effect of the resistor R37 is presented to the timing capacitors C11, C12 to stop the anode voltage of PUT1 rising to the trigger level.

The staircase generator counter 14 is initially set to its "all zeros" state by a positive pulse applied to the reset (R) input from an initial reset circuit 21. The latter comprises a capacitor C5 and a resistor R17 arranged as a differentiator to provide a positive pulse at the moment the logic power supply is established on connection of the battery.

The signal 11 applied to the gate 8 is taken from the thirteenth stage (Q13) of the counter 14. This signal occurs if the counter is driven beyond the range of the first twelve stages. Without this feature the staircase voltage, in the presence of a control voltage higher than about 7.3V, would rise up to its maximum value then fall back to its initial value, this cycle continuing indefinitely. The charger would therefore never switch off.

Figure 7:
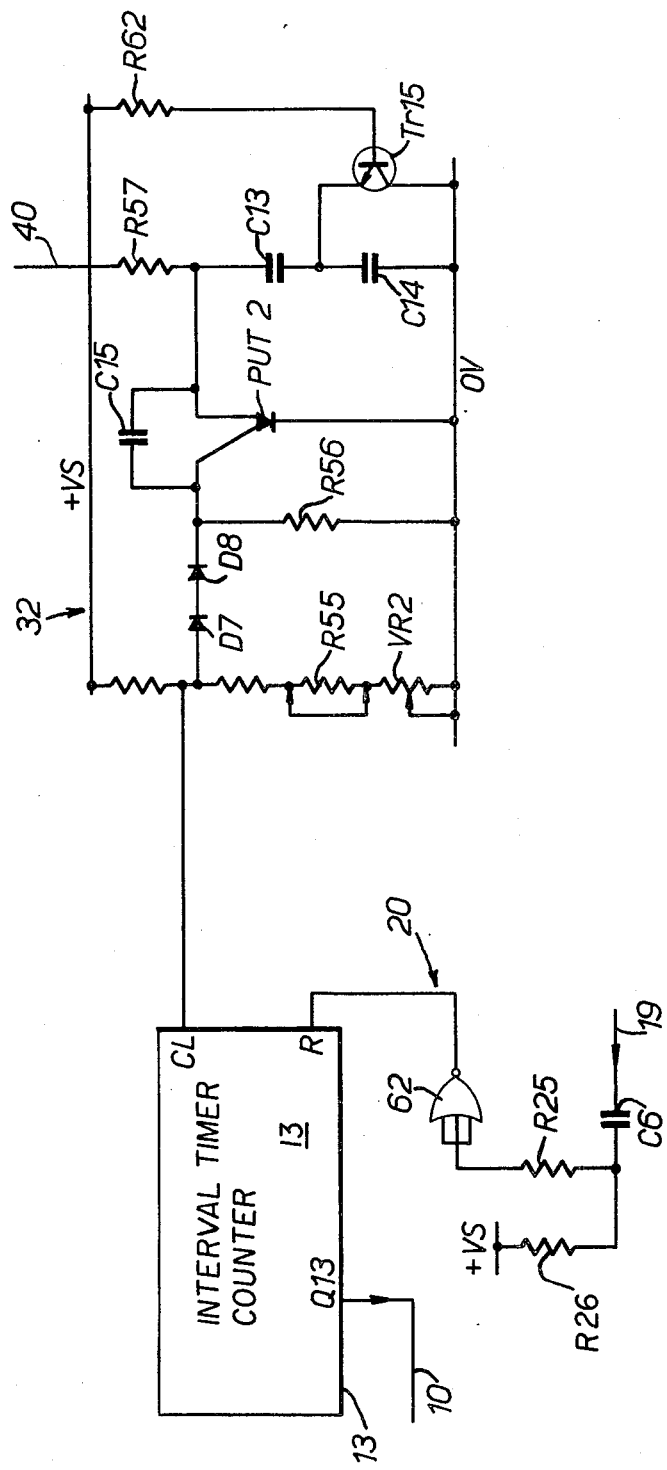
FIG. 7 shows an exemplary embodiment of an interval timer counter, the driving clock and reset gate associated therewith of FIG. 3.

As shown in FIG. 7 the steps in the staircase voltage 17 are timed by a second binary counter which is described as the interval time counter 13. This counter is associated with a clock 32 and a reset gate 20. The signal 10 applied to the gate 8 and the green lamp switching transistors Tr3, Tr4 is obtained from the 13th stage (Q13) of the counter 13. Clock pulses are applied to the clock (CL) input continuously from the clock 32 when the charger terminal voltage is in excess of 2.35 V.p.c.

Reset pulses are applied to the reset (R) input from the reset gate 20 at the beginning of each step in the staircase voltage.

The clock 32 is of similar form to the clock 18, the transistor Tr15, resistor R62 and capacitors C13 and C14 of the clock 32 corresponding respectively to the transistor Tr14, resistor R52 and capacitors C11 and C12 of the clock 18. The additional features are two temperature compensating diodes D7, D8 connected between the gate of an unijunction transistor PUT2 and the gate reference voltage source, a gate resistor R56 to bias the two diodes, an adjustment to vary the gate reference voltage and a noise rejection capacitor C15 connected between the gate and anode of the unijunction transistor PUT2 to prevent the clock from responding to spurious voltage spikes. The timing resistor R57 is connected by a conductor 40, to a tapping on the battery potential divider comprising the resistors R2 and R58 to R61 (see FIG. 5). The tapping gives the three cell equivalent of the battery voltage. The clock 32 is initially calibrated to start pulsing at a charger terminal voltage of 2.35 ±0.02V per cell by adjustment of the PUT2 gate reference voltage. This adjustment is provided by a preset resistor VR2 and a linked resistor R55. The diodes D7 and D8 trim the negative temperature coefficient of the PUT2 trigger voltage so as to be approximately equal to the negative temperature coefficient of the battery voltage on charge.

The reset gate 20 comprises an inverter gate 62 a current limit resistor R26 and a differentiator formed by a capacitor C6 and a resistor R25. The input signal 19 to the differentiator is taken from stage 5 (Q5) of the staircase generator counter 14. The output of the differentiator is applied to the input of the inverter gate 62 via the resistor R26. In the quiescent state the inverter gate input is held at the level of the +Vs line. The inverter output is therefore at OV. A "O" to "I" change of the Q5 output of the counter 14 has no effect on the inverter output since this produces a positive pulse in excess of +Vs at the inverter input. A "I" to "O" change in the Q5 output, however, produces a negative pulse at the inverter input and therefore a positive pulse at the inverter output. This resets the counter 13. Since the first stage of the D-A converter 15 is connected to the Q6 output of the counter 14, each step change in the staircase voltage 17 coincides with a "I" to "O" transition of the Q5 output. Thus the counter 13 is reset at every step change in the staircase voltage 17.

It is believed that the operation of the charger will be clear from the detailed description of its arrangement in conjunction with the general remarks on the features of the invention.

What I claim as my invention and desire to secure by Letters Patent is:

1. Automatic electric battery charging apparatus of the taper charge type for supplying a direct charging current to battery terminals from a.c. supply terminals, comprising: means for generating a control signal representative of the difference between a first signal dependent on the battery voltage and a second signal dependent on the a.c. supply voltage; and terminating means responsive to the rate of rise of said control signal for initiating the termination of a phase of the charge when the rate of rise of said control signal falls below a predetermined value.

2. Apparatus as in claim 1 wherein said means for generating a control signal includes means for generating said first signal and means for generating said second signal whereby said first and second signals are so proportioned that said control signal is substantially independent of fluctuation of said a.c. supply voltage.

3. Apparatus as in claim 1 further comprising means for generating a reference voltage; means for determining the rate of rise of said control signal and including a voltage comparator for comparing said control signal with said reference voltage, said means for generating a reference voltage inlcudes means responsive to said voltage comparator for repeatedly increasing said reference voltage by a predetermined step voltage relative to said control signal when said control signal exceeds said reference voltage, and said terminating means being actuated when the time interval between two successive voltage steps exceeds a predetermined value.

4. Apparatus as in claim 3 wherein said means for generating said control signal includes means for maintaining said control signal constant relative to said first signal dependent on the battery voltage and said reference voltage is increased step-by-step.

5. Apparatus as in claim 3 wherein the voltage steps are substantially equal.

6. Apparatus as in claim 3 wherein said terminating means terminates the charge completely, and the predetermined time interval is sufficient to provide an equalizing charge.

7. Apparatus as in Claim 6 wherein the predetermined time interval is not less than half an hour.

8. Apparatus as in claim 3 for charging lead-acid batteries wherein said reference voltage is increased by steps equivalent to not more than .020 volts per cell.

9. Apparatus as in claim 3 wherein said means for repeatedly increasing said reference voltage includes a binary weighted resistance network and a binary reference counter for controlling said binary weighted resistance network to vary the effective resistance thereof step-by-step.

10. Apparatus as in Claim 9 wherein said means for repeatedly increasing said reference voltage further includes a clock oscillator controlled by said voltage comparator to step said binary reference counter to incease said reference voltage by a step only when said control signal exceeds said reference voltage.

11. Apparatus as in claim 3 wherein said means for determining the rate of rise of said control signal includes an interval timer counter to determine said time interval and adapted to be reset whenever said reference voltage is increased by a step, an oscillator for generating counting signals for said interval timer counter; and said interval timer generating a signal upon counting a predetermined count to actuate said terminating means.

12. Apparatus as in claim 3 further comprising means for maintaining said terminating means inoperative until the battery voltage exceeds a predetermined value.

13. Apparatus as in claim 12 for charging lead-acid batteries wherein said predetermined value is 2.35 volts per cell.

14. Apparatus as in claim 2 wherein said means for generating said first signal includes means for sampling the battery voltage whereby said first signal is proportional therto; said means for generating said second signal includes means responsive to said a.c. supply voltage whereby said second signal is proportional thereto; and said means for generating a control signal includes means for determining the difference between said first and second signals.

15. Apparatus as in claim 14 wherein said means for determining the difference is a summing network forming part of said means for sampling the battery voltage and said means for generating said second signal is connected to said summing network.

16. Apparatus as in claim 15 wherein said means for sampling is a weighted resistance network and said means for generating said second signal includes means for obtaining a signal representative of said a.c. supply voltage, means for rectifying said signal representative of said a.c. supply voltage to provide a rectified signal having a polarity opposite to the polarity of the battery voltage sampled by said weighted resistance network, and means for reducing said rectified signal; said summing network is a resistance network forming part of said weighted resistance network; and said means for reducing said rectified signal is connected to said resistance network whereby said control signal is the algebraic sum of said first and second signals.

17. Apparatus as in claim 16 wherein said weighted resistance network has a value of 20 kilohms per cell of the battery, said a.c. supply voltage is 230 volts and said resistance network and said means for reducing said rectified signal are determined to produce said control signal having a voltage of 4.5 volts with said battery voltage being 2.60 volts per cell.

18. Apparatus as in claim 16 wherein said means for generating said second signal further includes means for smoothing said rectified signal and means for smoothing said control signal.

* * * * *